March 6, 1928.  J. P. MAXFIELD  1,661,539
PHONOGRAPH SYSTEM
Filed Oct. 2, 1923  2 Sheets-Sheet 1
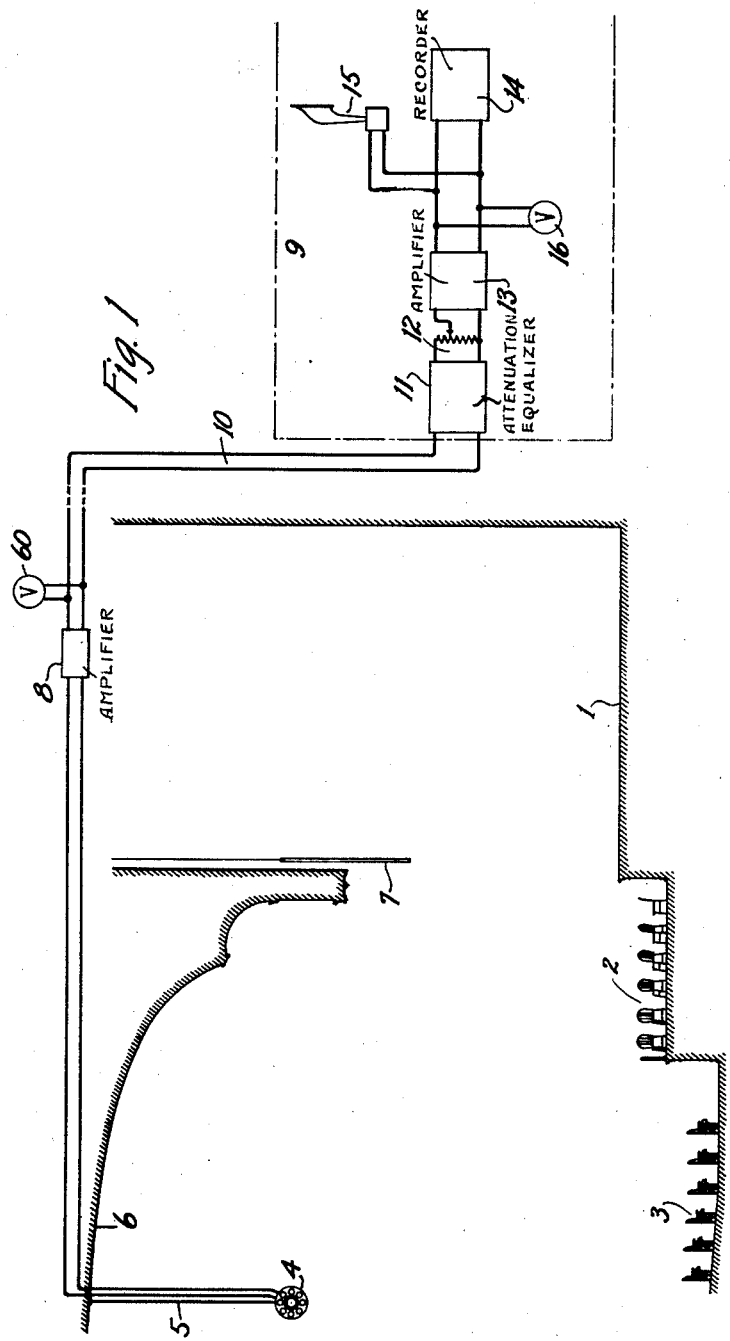
Inventor:
Joseph P. Maxfield,
by [signature] Atty.

March 6, 1928.
J. P. MAXFIELD
1,661,539
PHONOGRAPH SYSTEM
Filed Oct. 2, 1923
2 Sheets-Sheet 2
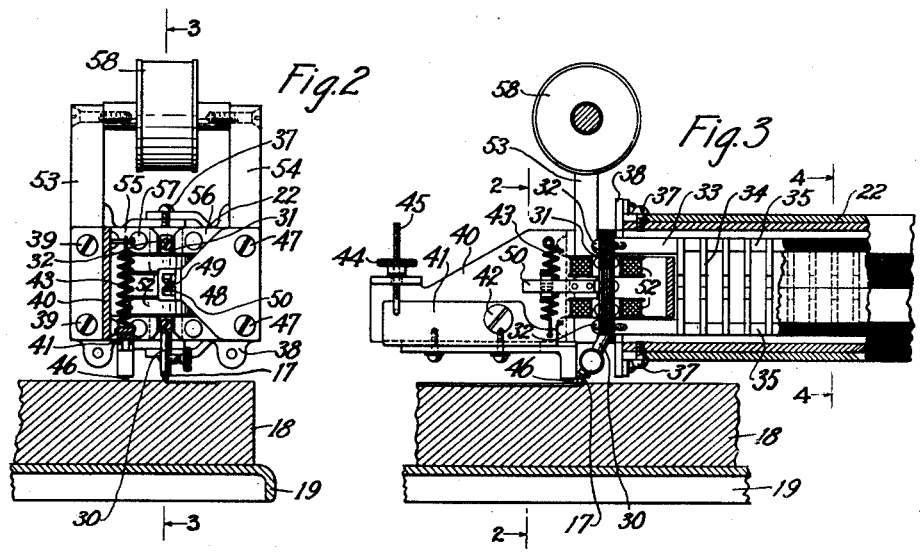
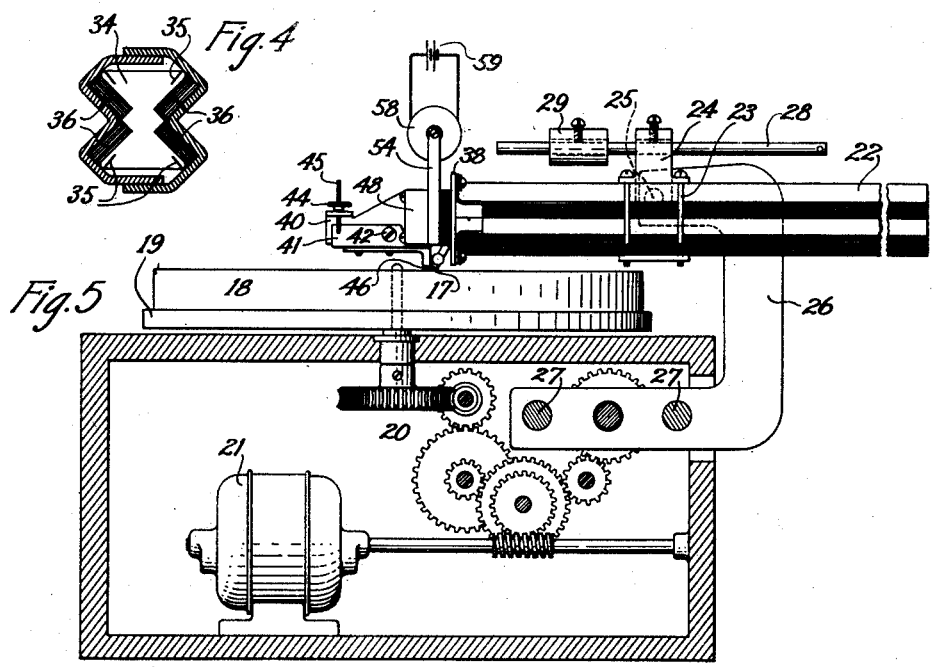
Inventor:
Joseph P. Maxfield,
by Joel R. Palmer Atty Patented Mar. 6, 1928.

1,661,539

UNITED STATES PATENT OFFICE.

JOSEPH P. MAXFIELD, OF MAPLEWOOD, NEW JERSEY, ASSIGNOR TO WESTERN ELECTRIC COMPANY, INCORPORATED, OF NEW YORK, N. Y., A CORPORATION OF NEW YORK.

PHONOGRAPH SYSTEM.

Application filed October 2, 1923. Serial No. 666,148.

The invention relates to phonograph systems and has for an object to make master phonograph records.

Prior to the present invention it has been the practice to make master phonograph records by the so called "acoustical" methods, i. e. the sound waves to be recorded impinge directly upon the phonograph recorder diaphragm which recorder carries the stylus. This method of recording has the objection that in making a record of an orchestral rendition the several pieces of the orchestra are arranged in close proximity to the horn of the recorder. A test record is then made and the sound recorded thereon is reproduced in order to ascertain if the arrangement of the artists in the orchestra has the proper one for producing a record which will give a sound effect corresponding to that which the average member of the audience will hear. Occasionally it is not. It is therefore necessary to rearrange the artists and usually this must be done several times before obtaining a record which has recorded on it the sounds, from the several members of the orchestra, in their proper and relative intensities. This system of recording makes it impossible to record the music from an orchestra during a public performance, and has the further objection that only a small number, such as 15 or 20 pieces can be placed close enough to the horn to make an appreciable effect on the recording.

Prior to this invention it had been proposed to use an electrical method for making master phonograph records and this method made use of a transmitter which received the sound waves to be recorded. Prior transmitters had a prominent natural frequency which imposed the limitation that the transmitter needed to be placed very close to the source of sound waves to be recorded in order that there might be recorded, sound waves which had a frequency different from that of the natural frequency of the transmitter. The transmitter in this case just as the horn in the case of the "acoustical" method produces a distorted effect and the necessity arises in both cases of finding by trial some arbitrary arrangement of the members of the orchestra in attempting to simulate the sound wave effect received by the average person in the audience, and in no case can the relation of the intensity of the fundamental to its harmonics be maintained. In using electrical transmitters of the type just described no satisfactory results can be obtained by placing a transmitter at some distance from the sound wave source because such a transmitter is acted upon by only very weak forces, as it is some distance away and it responds only to a very narrow band of frequencies adjacent the natural frequency and all other frequencies below and above are lost.

The object of the present invention is to produce master phonograph records electrically without interfering with the public performance of the artist or artists. An adjunctive object is to produce a master record having recorded thereon sound waves corresponding to the sound wave effect received by the average member of the audience.

This is accomplished by making use of the type of transmitter disclosed in E. C. Wente Patent No. 1,333,744 of March 16, 1920. It has been found that a transmitter of this type may be located far enough away from the artist or artists, so that it can be actuated by a sound wave effect corresponding to that received by the average member of the audience while producing an electrical effect which is a substantially faithful translation of the sound wave effect producing it. Use is also made of a high quality recorder such as the highly damped type of phonograph recorder described hereinafter and in the paper entitled "Methods of high quality recording and reproducing of music and speech based on telephone research", by J. P. Maxfield and H. C. Harrison, published in the Journal of the American Institute of Electrical Engineers, March 1926, pages 243 to 253. The quality of reproduction of the recorder is comparable to the quality of transmission of the transmitter and the electrical energy of the system is brought to a desired value by the use of audion type amplifying devices which also have a high quality. In case the recording machine is located at some distance from a public performance where the pick up transmitter is located, an attenuation equalizer may be employed to compensate for any distortion of the electrical currents produced by the telephone line connecting the transmitter to the recorder.

A monitoring arrangement is also used for supervising the production of records, whereby the electric current, employed to actuate the recorder, may be regulated while a record is being made.

For further details of the invention reference may be made to the drawings wherein Fig. 1 is a schematic representation of an electrical recording system and its relation to the theatre, or other public playhouse where the transmitter is located, and to the recording room.

Fig. 2 is a sectional elevation on line 2—2 of Fig. 3 of a highly damped electrical recorder which may be employed to cut a wax record.

Fig. 3 is a sectional elevation on line 3—3 of Fig. 2.

Fig. 4 is a sectional elevation on line 4—4 of Fig. 3.

Fig. 5 is an elevation of a recording machine which may be employed in connection with the recorder of Figs. 2, 3, and 4.

Referring in detail to the drawings a stage 1 with orchestra pit 2 and seats 3 for the audience are shown. The transmitter 4 of the type shown in Wente, supra, is located at some distance from the orchestra 2 and stage 1 (in the case of recording music from the orchestra or sounds from artists on the stage) and is illustrated as being suspended by a cord 5 or the like from the ceiling or super-structure 6 of the theatre. In the case of the Capitol Theatre, New York city, the transmitter is located 40 ft. in front of the stage and 40 ft. in the air and in this position it receives substantially the same sound wave effect as is received by the average member of the audience. Furthermore, it does not interfere with the public performance by the orchestra 2, or by the artist or artists on the stage 1. Furthermore, the transmitter is out of the path of the beam of light projected on the screen 7 from the moving picture machine (not shown). Local to the transmitter 4 is employed an amplifying set 8 of audion type vacuum tubes. If desired, an additional transmitter on the stage 1 may be used. Local to the amplifier 8 is a volume indicator such as voltmeter 60 which may be read in adjusting amplifier 8 (by well known means not shown) to give a desired value of voltage impressed on line 10.

The recording room 9 which may be at some distance from the theatre is in electrical communication with the transmitter 4 and the amplifier 8 over the conductors 10. These conductors 10 may be connected to an attenuation equalizer 11 which may be of the form shown and described in Hoyt Patent No. 1,453,980, May 1, 1923. This attenuation equalizer compensates for the distortion of the electric currents due to the attenuation of the line 10. The equalizer 11 is connected to an amplifier 13 which is similar to 8 and which is provided with means such as potentiometer 12 for regulating the intensity of the amplified currents. The current from amplifier 13 is supplied to the electrical recorder 14.

A loud speaker 15, located adjacent the recording machine, is supplied with current from the amplifier 13. This loud speaker is adapted to be in operation while the master record is being cut, thus making it possible to monitor the record during its production.

If, by listening to the loud speaker 15 it is perceived that the distortion is so great due, for instance, to noises in the amplifier or in the telephone line, that a satisfactory record cannot be made, the recording may be stopped, thereby saving the trouble and expense of finishing the record. Without the monitoring system, the fact that a record is unsatisfactory cannot be ascertained until the master record is made, plated, and reproduced.

If it is ascertained that the incoming electric currents have an intensity which is either too great or too small, as shown by voltmeter 16 connected across amplifier 13, the potentiometer is manipulated accordingly while the record is being made. Cutting through from one groove to the next or making the recorded feeble portions so weak that they are lost in surface noise can, therefore, be avoided.

In the case of "acoustical" recording from a symphony orchestra, the orchestra must play so that the fortissimo is suppressed and the pianissimo amplified in order to drive the stylus within proper bounds. With the present system, such an orchestra may play with natural force and effect, the current from amplifier 13 being kept within proper limits by manipulating potentiometer 12 as suggested by monitoring with loud speaker 15 and voltmeter 16.

Referring to Figs. 2 to 5, the stylus 17 of the recorder is shown in operative relation to a wax master record 18. The record 18 is supported by a turn table 19 which is driven from motor 21 by suitable means such as a belt or a train of gears 20. The recorder shown in Figs. 2 to 4 is provided with a metal casing 22 a section of which is shown in Fig. 4 and which is clamped by means such as bolts 23 to a cradle 24 which is pivoted at 25 to the cross head 26. This cross head is supported and guided by rods 27 and is suitably driven along these rods by the motor 21 and the train or gears connected thereto. The cradle 24 carries a rod 28 which supports a counter balance 29 which may be adjusted to provide a proper pressure of the stylus on record.

The stylus 17 is held in a stylus holder 30 which is suitably fastened to the armature 31 of the recorder. This armature is fastened by screw bolts 32 to the framework 33 which carries a plurality of spaced plates such as 34 which are interconnected by four spring strips 35. Each of the plates 34 is, therefore, elastically connected by means of the spring strips 35 to the adjacent plates 34. The operation of the stylus causes a rotational movement of the plates 34 which is resisted in part by the spring strips 35 and in part by the tinfoil sheets 36 which are closely packed to provide films of air therebetween and which lie between the edges of the plates 34 and the casing 22.

Suitably fastened to the casing 22, for instance, by screw bolts 37 is the plate 38 which is fastened to one side thereof by screw bolts 39, the supporting arm 40 which carries the advance ball device. This comprises an arm 41 pivoted to arm 40 at the screw 42. The arm 41 is held under tension by spring 43 fastened at one end to the arm 41 at the other end to the arm 40. The thumb screw 44 supported by arm 40 and operating on arm 41 through the bolt 45 is manipulated to adjust the advance ball 46 so that a desired depth of cut shall be obtained.

The plate 38 also has fastened to it by screw bolts 47 a plate 48 of non-magnetic material which carries the supporting or centering device 49 for the extension 50 of the armature 31.

The coils 52 which receive the incoming amplified current are located in a recess in the member 33. The bolts 39 and 47 also serve to hold the magnet poles 53 and 54 as well as the U-shaped polar extensions 55 and and 56 thereof to the brass plate 38. The U-shaped polar extensions 55 and 56 embrace the coils 52 and terminate closely adjacent the armature 31. Each of the four projecting ends from the pole pieces 55 and 56 is fastened by a rivet or screw bolt 57 to the plate 38. The pole pieces 53 and 54 are provided with a magnetic coil 58 which may be supplied with polarizing current from a battery 59 as shown in Fig. 5. A permanent magnet may be employed instead of the electromagnet shown.

It has been found that the recorder shown in Figs. 2 to 4 has a transmission which is substantially constant over a range of from about 80 to 8,000 cycles and records produced by the above system using this recorder have given a remarkably good quality.

While the invention has been particularly described in connection with phonograph systems, it is applicable to other uses. For instance, the amplified currents from amplifier 13 may be supplied to some other type of receiving device, such as a modulator for radio frequency currents to be broadcasted.

While the phonograph recording system has been illustrated as operating but one recording machine, it may be employed to operate a plurality of recorders, connected in parallel or in series to the one shown, whereby a plurality of master wax records may be simultaneously cut.

What is claimed is:

1. A reproducing or phonograph recording system, comprising an electric circuit including a reproducer or recorder and a pick-up device, the said pick-up device being located in such a position in the auditorium with respect to the sound source that the sound wave effect at said device will be substantially the same as that received by the average member of the audience.

2. In a system for recording sound, a transmitter disposed at such a distance from a large area that the same sound source produces from any point within said area the same sound effect on said transmitter.

3. In a system for recording sound, a transmitter disposed at substantially equal distances above and in front of a performance.

In witness whereof, I hereunto subscribe my name this 27th day of September A. D., 1923.

JOSEPH P. MAXFIELD.